(12) United States Patent
Fairy

(10) Patent No.: US 7,344,372 B2
(45) Date of Patent: Mar. 18, 2008

(54) INJECTION MOLDING NOZZLE HAVING AN ANNULAR FLOW TIP

(75) Inventor: Fabrice Fairy, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 255 days.

(21) Appl. No.: 11/065,167

(22) Filed: Feb. 24, 2005

(65) Prior Publication Data
US 2005/0271766 A1 Dec. 8, 2005

Related U.S. Application Data

(60) Provisional application No. 60/575,841, filed on Jun. 2, 2004.

(51) Int. Cl.
*B29C 45/20* (2006.01)
(52) U.S. Cl. ...................................... 425/549; 425/572
(58) Field of Classification Search ................ 425/549, 425/572, 588
See application file for complete search history.

(56) References Cited

U.S. PATENT DOCUMENTS

| | | | |
|---|---|---|---|
| 3,915,358 A | 10/1975 | Hehl | |
| 4,212,625 A | 7/1980 | Shutt | |
| 4,303,382 A | 12/1981 | Gellert | |
| 4,501,550 A | 2/1985 | Nikkuni | |
| 4,711,602 A | 12/1987 | Baker | |
| 4,712,990 A | 12/1987 | Kudert et al. | |
| 4,781,572 A | 11/1988 | Boring | |
| 4,787,836 A | 11/1988 | Osuna-Diaz et al. | |
| 4,965,028 A | 10/1990 | Maus et al. | |
| 5,208,052 A | 5/1993 | Schmidt et al. | |
| 5,324,191 A | 6/1994 | Schmidt | |
| 5,513,976 A | 5/1996 | McGrevy | |
| 5,545,028 A | 8/1996 | Hume et al. | |

(Continued)

FOREIGN PATENT DOCUMENTS

DE 196 08 676 C1 1/1997

(Continued)

OTHER PUBLICATIONS

U.S. Appl. No. 11/142,915, filed Jun. 2, 2005, Fairy.

(Continued)

*Primary Examiner*—Tim Heitbrink
(74) *Attorney, Agent, or Firm*—Medler Ferro PLLC

(57) ABSTRACT

A nozzle in an injection molding machine allows for smooth, blended melt flow into a mold cavity. In one example, this is accomplished through use of a nozzle having a nozzle body with a nozzle melt channel in fluid communication with a manifold melt channel and a nozzle tip. The nozzle tip includes a first melt channel in fluid communication with the nozzle melt channel and a plurality of release melt channels between the first melt channel and an annular melt channel. The annular melt channel is formed between a retaining device and the nozzle tip. The annular melt channel includes a decompression chamber in fluid communication with respective ones of the release melt channels and a compression chamber between the decompression chamber and a mold. A pressure difference formed between the respective release melt channels and the decompression chamber and between the decompression chamber and the compression chamber blends the molten material to even and balance flow into the mold cavity.

38 Claims, 13 Drawing Sheets

U.S. PATENT DOCUMENTS

| | | |
|---|---|---|
| 5,716,651 A | 2/1998 | McGrevy |
| 5,840,231 A | 11/1998 | Teng |
| 5,871,786 A | 2/1999 | Hume et al. |
| 5,879,727 A * | 3/1999 | Puri .................... 425/549 |
| 5,948,450 A | 9/1999 | Swenson et al. |
| 6,022,210 A | 2/2000 | Gunther |
| 6,089,468 A | 7/2000 | Bouti |
| 6,245,278 B1 | 6/2001 | Lausenhammer et al. |
| 6,273,706 B1 | 8/2001 | Gunther |
| 6,302,680 B1 * | 10/2001 | Gellert et al. ............ 425/549 |
| 6,305,923 B1 | 10/2001 | Godwin et al. |
| 6,349,886 B1 | 2/2002 | Bouti |
| 6,478,567 B1 | 11/2002 | Kushnir et al. |
| 6,524,093 B2 | 2/2003 | Bouti |
| 6,609,902 B1 | 8/2003 | Blais et al. |
| 6,679,697 B2 | 1/2004 | Bouti |
| 6,769,901 B2 * | 8/2004 | Babin et al. ............. 425/549 |
| 6,832,909 B2 | 12/2004 | Bazzo et al. |
| 2002/0081348 A1 | 6/2002 | Bouti |
| 2003/0209833 A1 | 11/2003 | Bemis et al. |
| 2004/0091562 A1 | 5/2004 | Pilavdzic et al. |
| 2004/0234646 A1 | 11/2004 | Benenati |
| 2005/0140061 A1 | 6/2005 | Puniello et al. |
| 2006/0018993 A1 | 1/2006 | Fairy |
| 2007/0082083 A1 | 4/2007 | Fairy |

FOREIGN PATENT DOCUMENTS

| | | |
|---|---|---|
| DE | 195 33 231 A1 | 3/1997 |
| DE | 19730380 | 1/1999 |
| DE | 100 08 722 A1 | 8/2001 |
| DE | 10 2004 032 336 B3 | 11/2005 |
| EP | 0 546 554 B1 | 3/1997 |
| EP | 0 962 296 A3 | 1/2001 |
| EP | 1295693 | 3/2003 |
| JP | 04320820 A | 11/1992 |
| JP | 2000-167883 A | 6/2000 |
| WO | WO 03/028974 A | 4/2003 |
| WO | WO 2005/090051 A1 | 9/2005 |
| WO | WO 2006/123237 | 11/2006 |

OTHER PUBLICATIONS

Ewikon Brochure, Oct. 2000.

Wright, Corin, "Improving Color Change in Hot Runner Molds," Plastics Machinery & Auxilliaries pp. 16-17 (Apr. 2003).

"HASCO Z1081/Magnetic Needle Valve Brochure", (Nov. 2005).

Hasco "Duese versuche Fur Z3310/25", Rec'd Sep. 8, 2006.

* cited by examiner

Section E-E

INJECTION MOLDING NOZZLE HAVING AN ANNULAR FLOW TIP

CROSS REFERENCE TO RELATED APPLICATIONS

This application claims benefit under 35 U.S.C. § 119(e) to U.S. Provisional Patent Application No. 60/575,841, filed Jun. 2, 2004, which is incorporated by reference herein in its entirety.

This application is related to co-pending U.S. Ser. No. 11/142,915, filed Jun. 2, 2005, which claims benefit under 35 U.S.C. § 119(e) to U.S. Provisional Patent Application No. 60/575,842, filed Jun. 2, 2004, which are incorporated by reference herein in their entireties.

BACKGROUND

1. Field

The present invention is related to a nozzle for an injection molding apparatus.

2. Related Art

In many injection molding systems available today, the systems include an injection molding machine having one or more nozzles for receiving melt from a manifold and transferring/distributing the melt to one or more mold cavities. This portion of an injection molding machine is often referred to as a cold runner or a hot runner system.

For injection molded parts of various colors, a first color molten material must be flushed from the system so that a second color molten material may be run through the injection molding machine to produce parts of different color. Residue material from the first/subsequent color of the molten material conventionally causes numerous shots of injection molded products to be defective because they have an undesirable blend of two colors of molten material. It is common for a substantial number of products to be defective in this way requiring multiple injection cycles to clear the runner system before useable products are formed.

Additionally, or aside from when color change may be a problem, unidirectional molecular orientation and weld/flow lines can be a potential cause for weakness in the structural integrity, dimensional accuracy, or cause unwanted birefringence of a molded product.

Therefore, what is needed is a system and method that substantially reduces residue of molten material in a gate area of an injection molding machine. Additionally, or alternatively, what is needed is a system and method for eliminating or substantially reducing unidirectional molecular orientation and/or weld/flow lines in a molded product.

SUMMARY

One embodiment of the present invention provides a nozzle for an injection molding apparatus. The nozzle includes a nozzle body, a nozzle tip, a retaining device, and an annular melt channel. The nozzle body has a nozzle melt channel, which can be in fluid communication with a melt channel in a manifold. The nozzle melt channel has a nozzle melt channel longitudinal axis. The nozzle tip includes first and second melt channels. The first melt channel is in fluid communication with the nozzle melt channel and has a first melt channel longitudinal axis that is coaxial with the nozzle melt channel longitudinal axis. The second melt channel is in fluid communication with the first melt channel and has a second melt channel longitudinal axis that, in one example, is substantially normal with respect to the first melt channel longitudinal axis. The retaining device can be used to position the nozzle tip with respect to the nozzle body. The annular melt channel is formed between the tip and the retaining device.

Another embodiment of the present invention provides a nozzle including a nozzle body and a seal device having an annular melt channel. The nozzle body has a nozzle melt channel, which can be in fluid communication with a melt channel in a manifold, and a nozzle melt channel longitudinal axis. The seal device includes first and second pieces. The first piece is used to position the second piece with respect to the nozzle body. The annular melt channel is formed between the first and second pieces, such that melt flows through the annular melt channel before entering, for example, a mold cavity.

Another embodiment of the present invention includes one of the above nozzles incorporated into an injection molding machine.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 5:
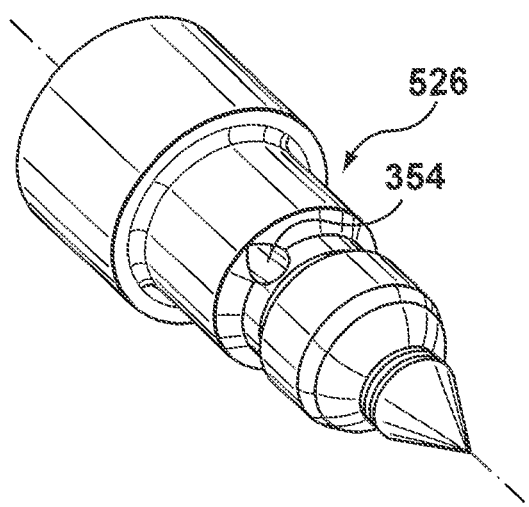
Figure 6:
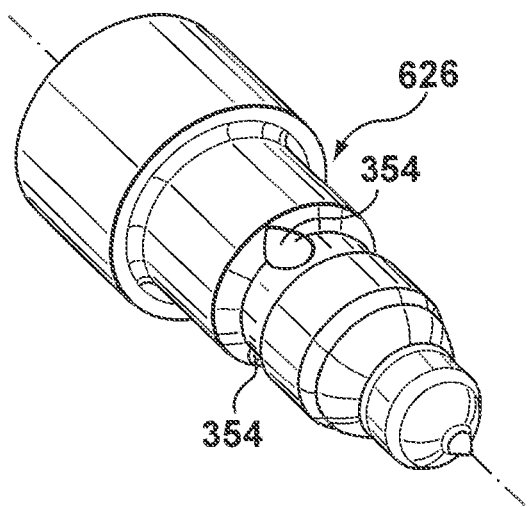
Figure 7:
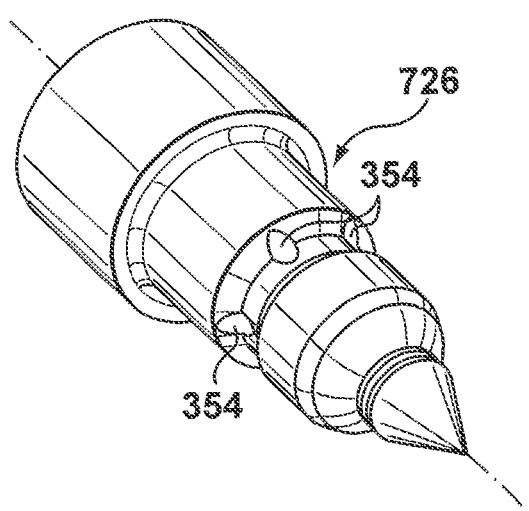

FIGS. 5, 6, and 7 show alternative nozzle configurations, according to various embodiments of the present invention.

Figure 1:
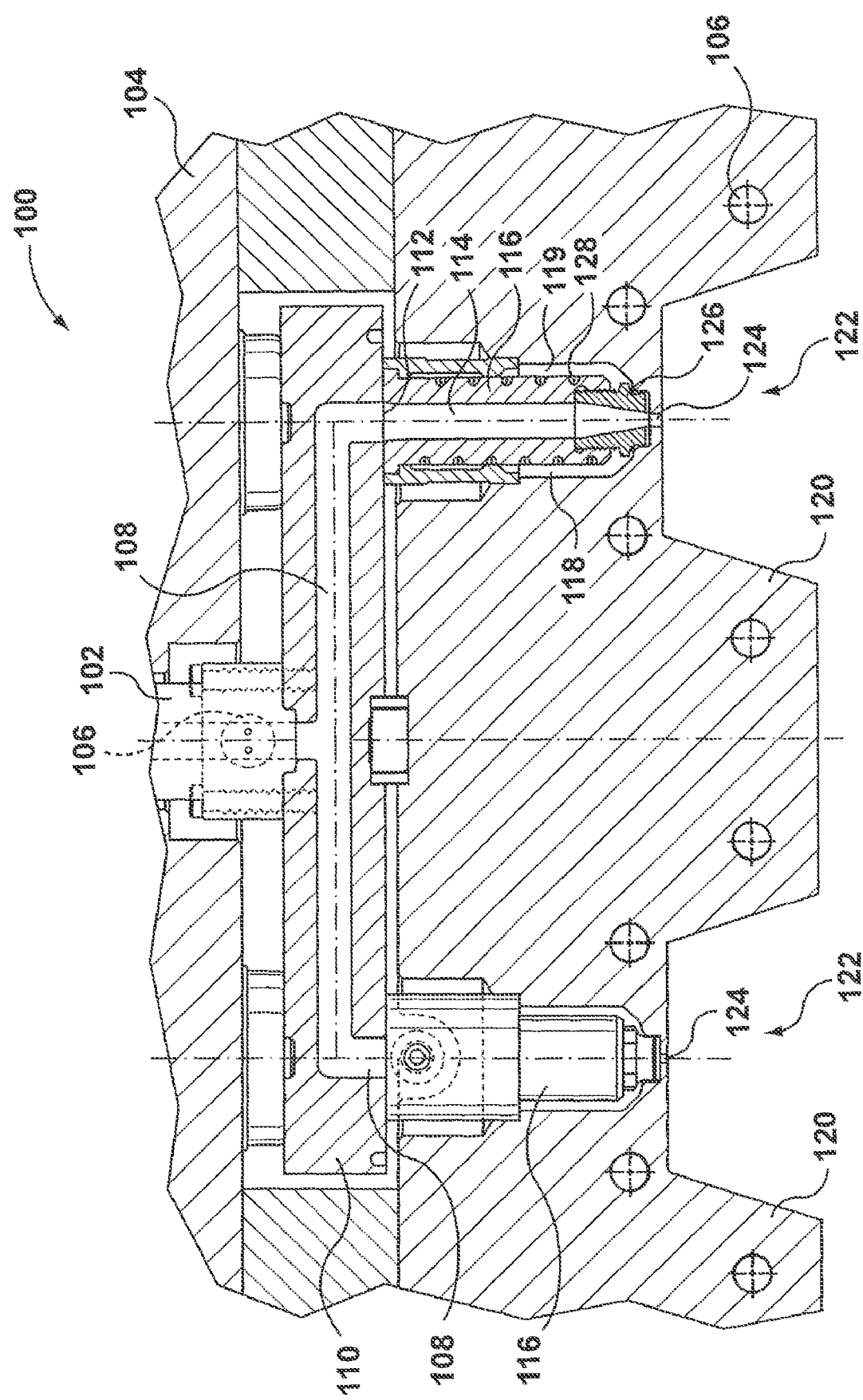
FIG. 1 illustrates a partial sectional view of an injection molding machine in which the present invention may be utilized.
Figure 8:
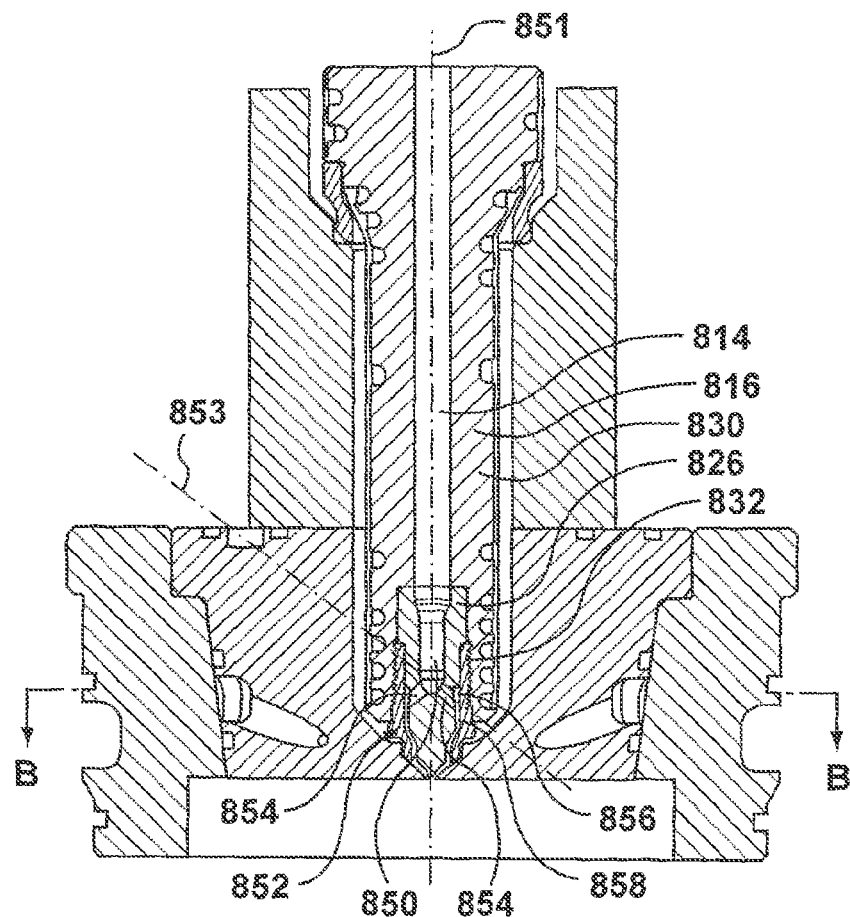
Figure 9:
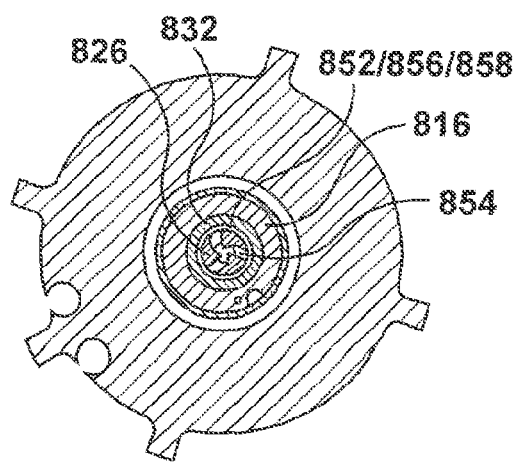

FIGS. 8 and 9 are side sectional and cross-sectional views, respectively, of a nozzle for use in the machine of FIG. 1, according to one embodiment of the present invention.

Figure 10:
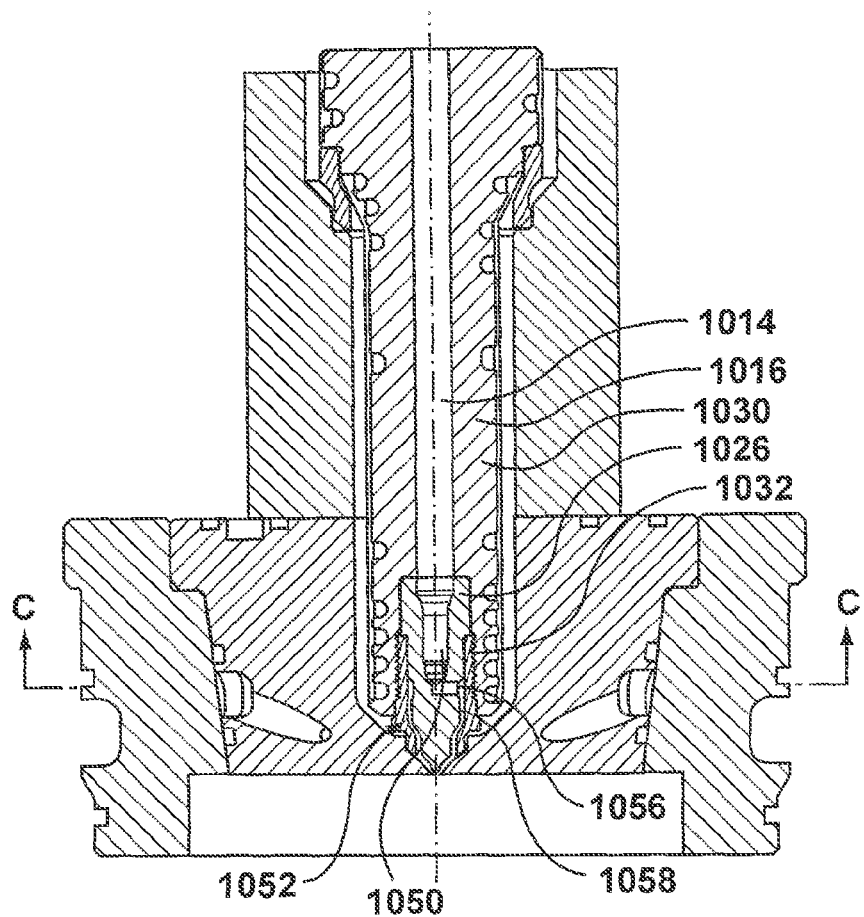
Figure 11:
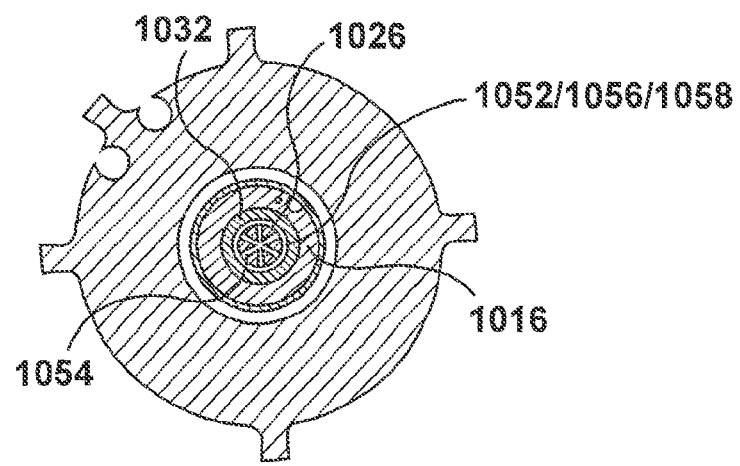

FIGS. 10 and 11 are side sectional and cross-sectional views, respectively, of a nozzle for use in the machine of FIG. 1, according to one embodiment of the present invention.

Figure 12:
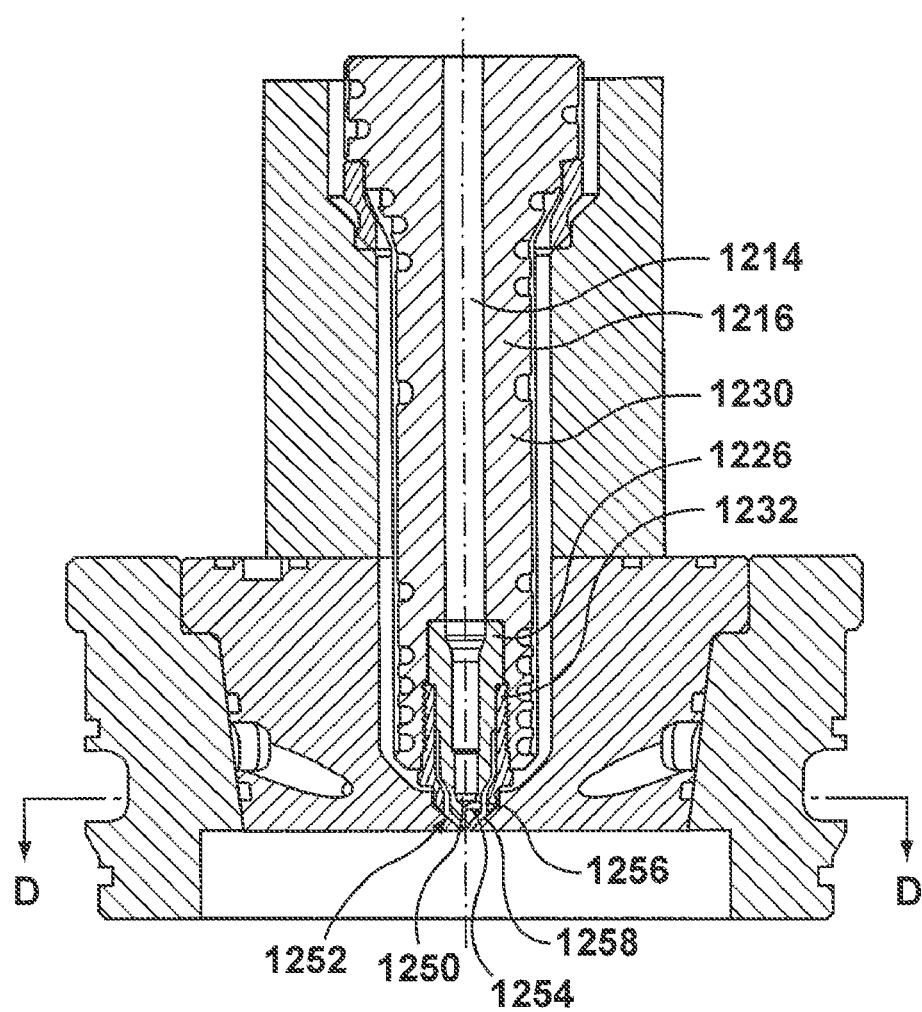
Figure 13:
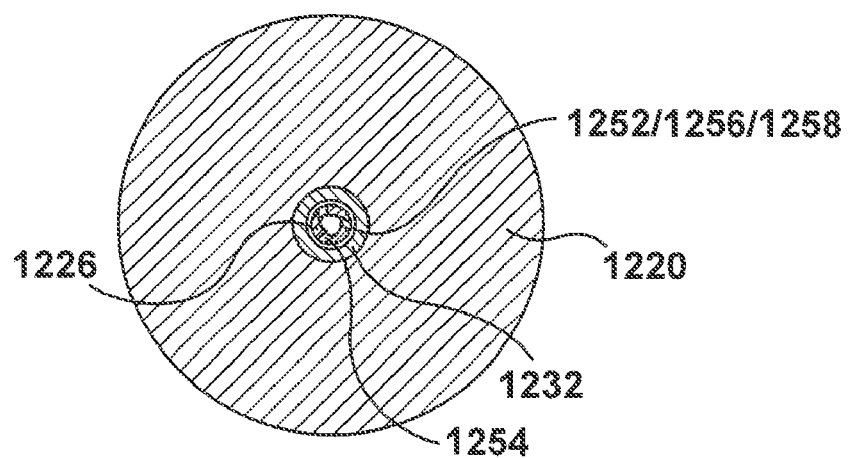

FIGS. 12 and 13 are side sectional and cross-sectional views, respectively, of a nozzle for use in the machine of FIG. 1, according to one embodiment of the present invention.

Figure 14:
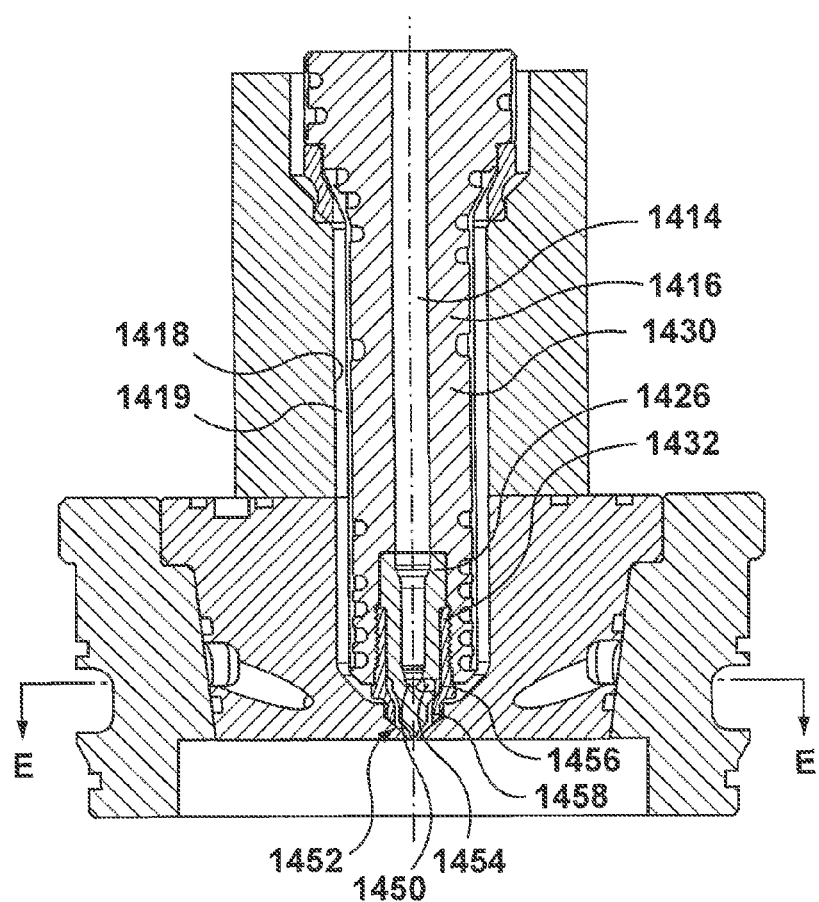
Figure 15:
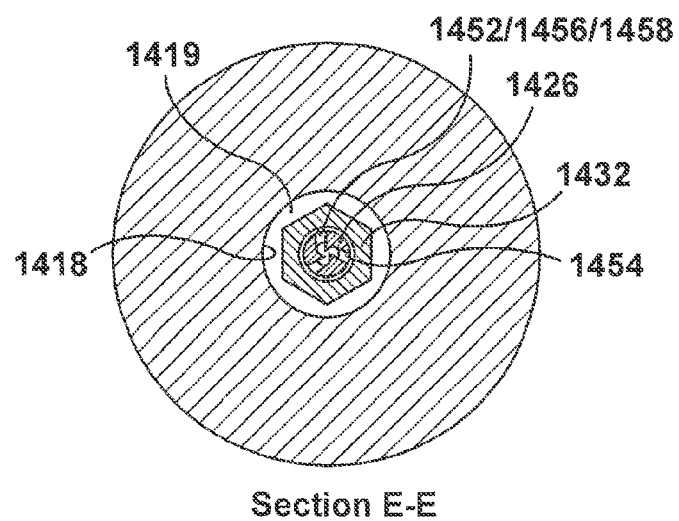

FIGS. 14 and 15 are side sectional and cross-sectional views, respectively, of a nozzle for use in the machine of FIG. 1, according to one embodiment of the present invention.

Figure 16:
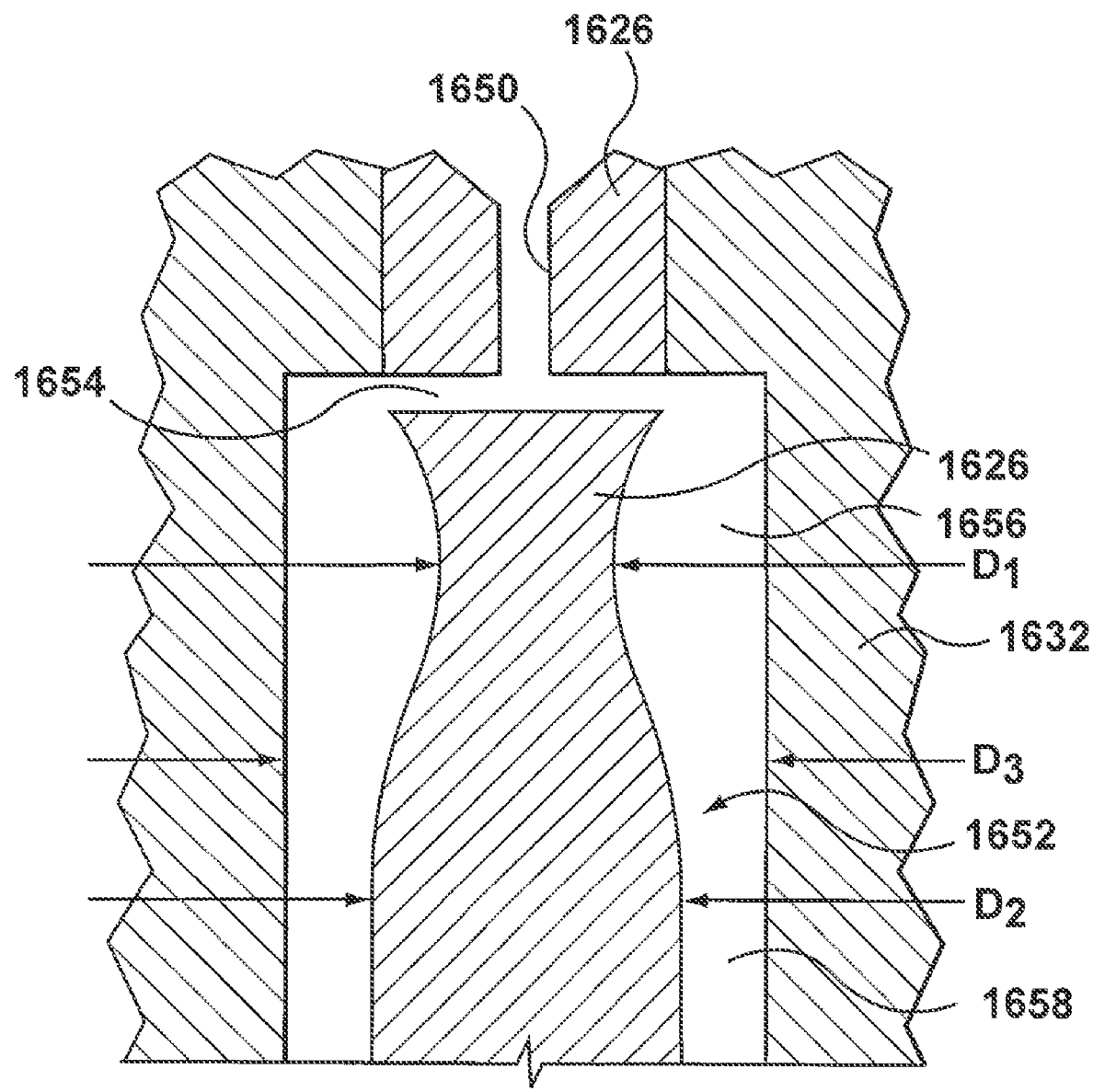

FIG. 16 is a side sectional view of a portion of a nozzle for use in the machine of FIG. 1, according to one embodiment of the present invention.

Figure 17:
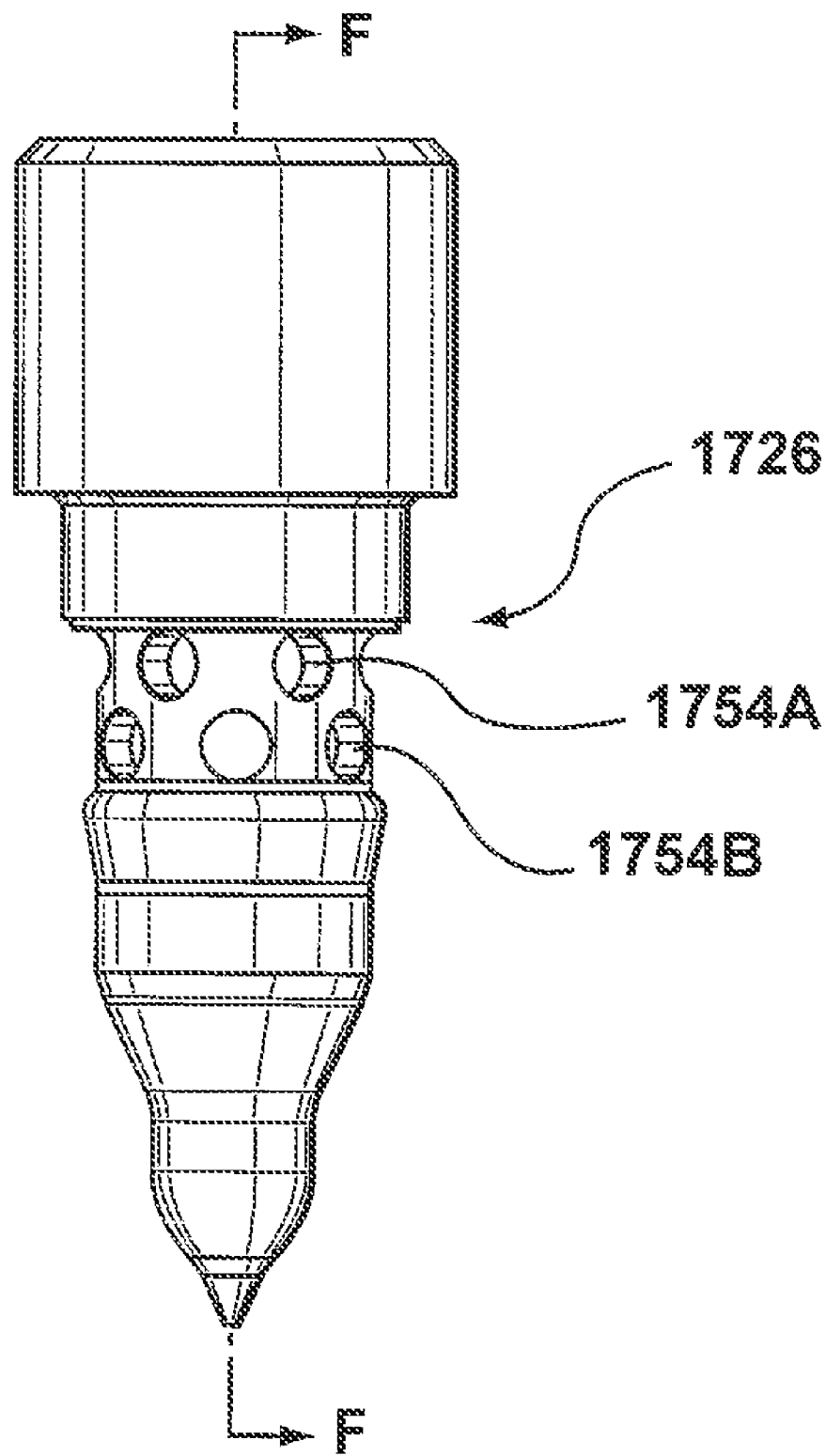
Figure 18:
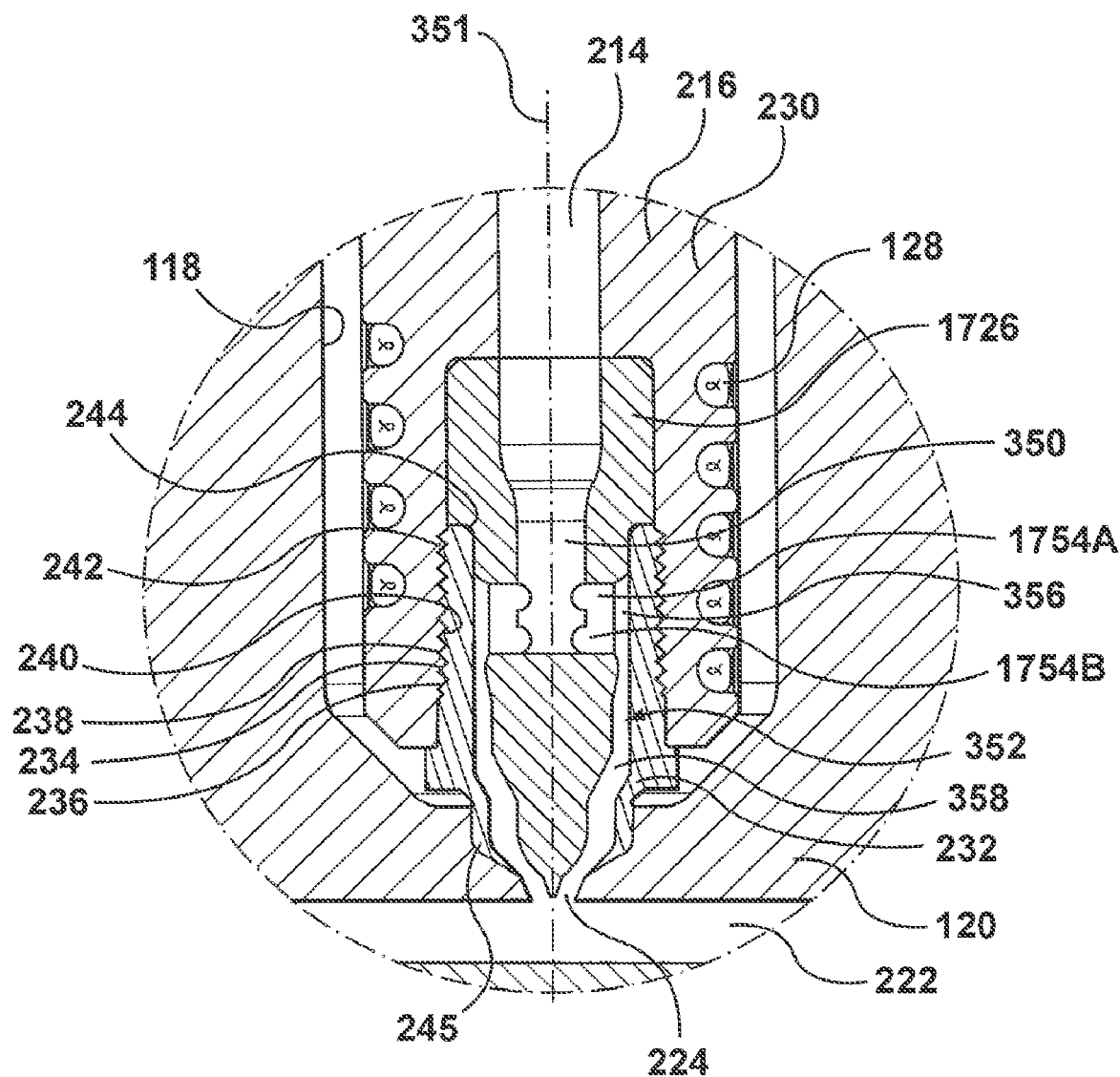

FIGS. 17 and 18 show a side view and a cross-sectional view (taken along line F-F), respectively, according to one embodiment of the present invention.

Figure 19:
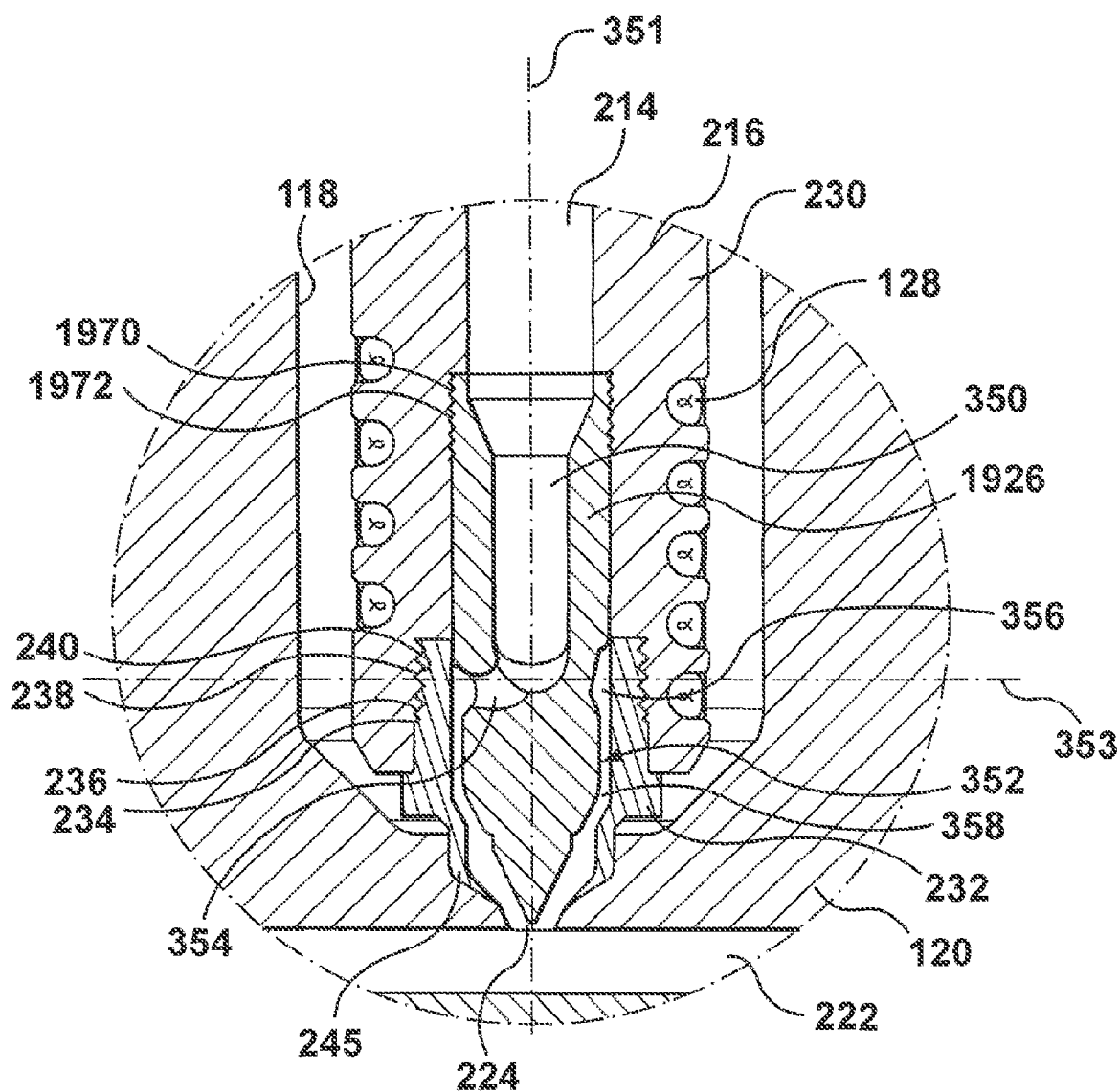

FIG. 19 shows a cross-sectional view of a portion of a nozzle, according to one embodiment of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

One or more embodiments of the present invention provide a nozzle in an injection molding machine that allows for an improved flow of a molten material into a mold cavity, which can substantially reduce or eliminate flow lines in an injected molded product. In one example, this is accomplished through use of a nozzle having a nozzle body with a nozzle melt channel, which can be in fluid communication with a manifold melt channel, and a nozzle tip. The nozzle tip includes a first melt channel in fluid communication with the nozzle melt channel and one or more release melt channels between the first melt channel and an annular melt channel.

In one embodiment of the present invention, the annular melt channel is formed between a retaining device and the nozzle tip. The annular melt channel includes a decompression chamber in fluid communication with respective ones of the release melt channels and a compression chamber between the decompression chamber and a mold cavity. In this embodiment, a pressure difference results between the respective release melt channels and the decompression chamber and between the decompression chamber and the compression chamber that acts to blend the molten material in the nozzle tip area more quickly and efficiently than current systems, such that it enters a mold cavity without flow lines, i.e., weld lines.

In one example, the material used for the nozzle tip is a high thermally conductive material, with a corrosion and abrasion resistance (e.g., wear resistant). A plurality of holes or bores, i.e., release melt channels, are located at a point where the nozzle tip separates from the retaining device. The holes are oriented with respect to a radial axis, and can be aligned with respect to a longitudinal axis or offset from this axis. The desired flow rate is used to determine the diameter of the exit holes.

In this example, and as discussed above, the nozzle tip is designed in conjunction with the retaining device to have the annular melt channel with decompression and compression chambers. The nozzle tip holes or bores exit to the decompression chamber, which creates a circular flow of the molten material around the nozzle tip in order to mix/blend the molten material. Then, under the growing pressure of the molten material in the decompression chamber, the molten material flows through the compression chamber, which acts as a pressure regulator and shear generator. This leads to an annular flow in a hot area where the molten material further blends to eliminate flow lines and/or ease color change.

The compression of the molten material occurs up to a seal area, which can be at a downstream portion of the retaining device and the mold gate area. As such, in the seal area a reduction of the annular surface of the nozzle tip, an increase in flow speed and shear rate of the melt, and an increase of the relative temperature of the molten material and hot runner components (e.g., the retaining device and the nozzle tip) allows for a re-melt of solidifying melt material in contact with the mold, which improves color change, in such applications, as well as melt flow.

Overall System

FIG. 1 shows an injection molding system 100 in which the present invention may be utilized. System 100 includes a sprue bushing 102 extending through a machine platen 104 for connection with a machine nozzle (not shown) that introduces a melt stream under pressure into the injection molding system via sprue bushing 102. From sprue bushing 102, melt flows into a manifold melt channel 108 provided in a manifold 110. In this embodiment, manifold 110 is a hot runner manifold and it allows the melt stream to be distributed through manifold outlets 112 into melt channels 114 provided in respective nozzles 116. Nozzles 116 are positioned within nozzle bores 118 of a mold plate 120, such that an insulative air space 119 is provided between nozzle 116 and mold plate 120. Each nozzle 116 is in fluid communication with a mold cavity 122 via a mold gate 124 so that the melt stream may be injected through nozzle melt channel 114 and a nozzle tip 126 into the mold cavities 122. A heater 128 surrounds nozzle 116 in order to keep the melt flowing with a desired viscosity. Cooling channels 106 are provided in mold plate 120 to provide cooling to mold cavities 122.

Exemplary Thermal Gated Nozzle

Figure 2:
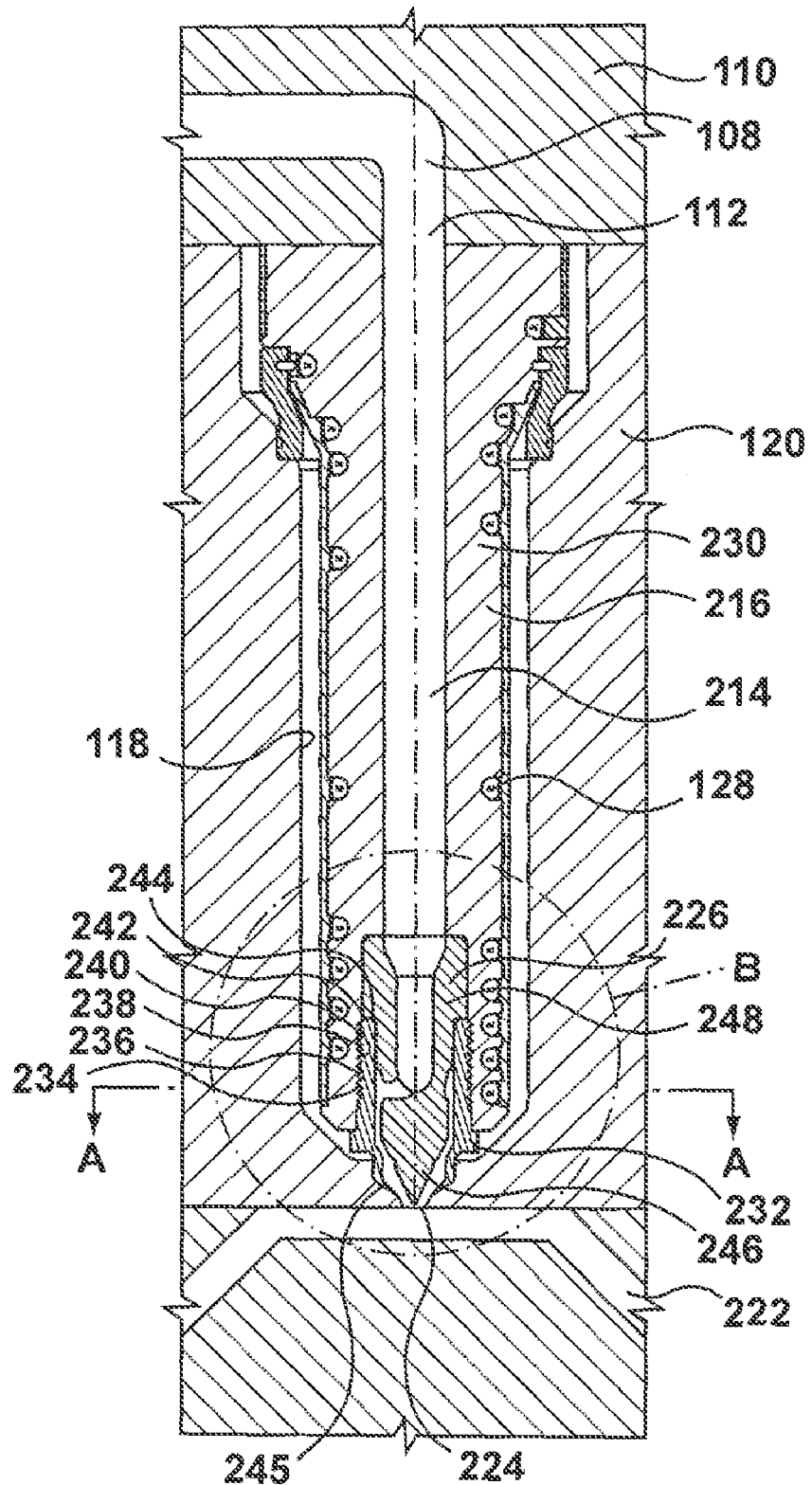
FIG. 2 shows a side sectional view of a nozzle for use in the machine of FIG. 1, according to one embodiment of the present invention.

FIG. 2 illustrates a side sectional view of a nozzle, according to one embodiment of the present invention, for use in the environment describe in FIG. 1. In this embodiment, a nozzle tip 226 is configured as a torpedo type nozzle tip, as will be described in more detail below. A nozzle 216 includes a nozzle body 230, nozzle tip 226, and a retaining device 232. In one example, nozzle tip 226 and retaining device 232 function as a two-piece nozzle tip/seal. Retaining device 232 positions nozzle tip 226 within nozzle body 230. In this embodiment, retaining device 232 is threadingly engaged through threads 234 on an outer wall 236 of retaining device 232 with complementary threads 238 on an inner wall 240 of nozzle body 230. When engaged, a shoulder 242 of retaining device 232 abuts a curved portion 244 of nozzle tip 226 to secure it to nozzle body 230. In one example, retaining device 232 also includes a sealing portion 245.

In one example, retaining device 232 is made from a steel based, a titanium based, a ceramic based, or other thermally insulative material.

In one example, nozzle tip 226 is made from a copper based, a steel based, or other thermally conductive material.

In another example, tip 226 is bimetallic and includes first and second portions 246 and 248. In one configuration, first portion 246 is more thermally conductive than second portion 248, possibly making second portion 248 thermally insulative. In an alternative configuration, second portion 248 is more thermally conductive than first portion 246, possibly making first portion 246 thermally insulative and/or wear resistant. In this example, a thermally conductive material is made from steel, copper, or the like based material. Also, in this example, a thermally insulative material is made from a steel, titanium, ceramic, or the like based material. It is to be appreciated that other materials that function similarly to those described above would become apparent to one of ordinary skill in the art upon reading this description, and are contemplated within the scope of the present invention.

Figure 3:
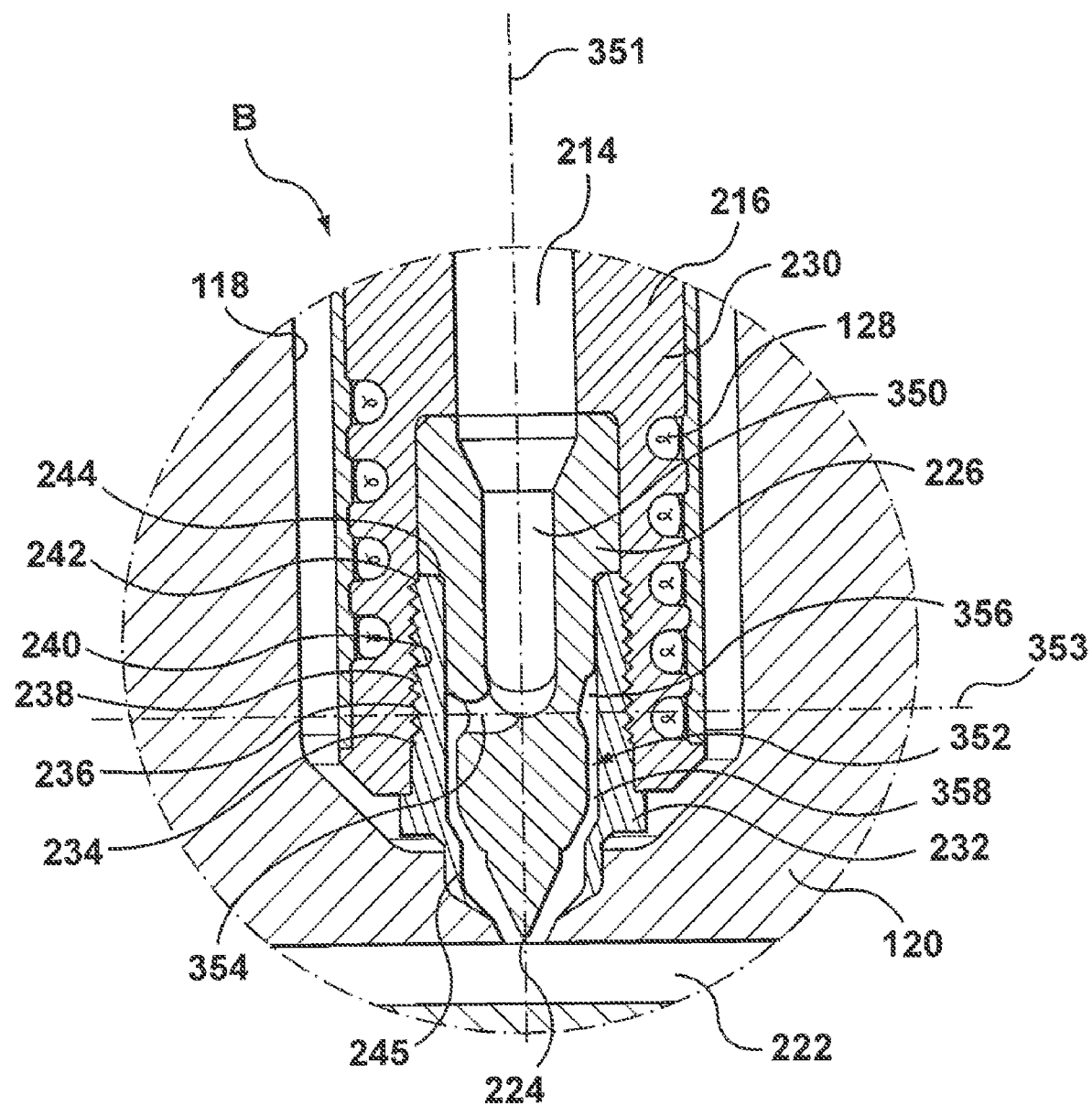
FIG. 3 is an enlarged view of a portion B of the nozzle of FIG. 2.

FIG. 3 is an enlarged view of portion B in FIG. 2, according to one embodiment of the present invention. In this embodiment, nozzle tip 226 includes a first melt channel 350 having a longitudinal axis 351 and that is in fluid communication at an upstream end with a nozzle body channel 214. First melt channel 350 is in fluid communication at a downstream end with at least one second melt channel 354 having a longitudinal axis 353. In one example, longitudinal axes 351 and 353 of first and second melt channels 350 and 354, respectively, are substantially normal with respect to each other. For example, longitudinal axes 351 and 353 are 90°±10° relative to each other. Second melt channel 354 is in fluid communication with an annular melt channel 352 formed between nozzle tip 226 and retaining device 232. Annular melt channel 352 includes a first portion 356 and a second portion 358.

Second melt channel 354 is a release or exit melt channel through which the molten material flows from first melt channel 350 of nozzle tip 226. Second melt channel 354 can be formed as a bore or a hole through a wall of nozzle tip 226. Depending on an application and/or material make-up of nozzle tip 226, there can be up to six release melt channels 354. Various other number of release melt channels 354 are also contemplated.

In one example, longitudinal axis 353 of release melt channel 354 is substantially normal or perpendicular to longitudinal axis 351 of first melt channel 350. As discussed above, substantially normal can be about 90°+/−10° for certain applications, and different ranges for other applications. In another example, longitudinal axis 353 of release melt channel 354 is angled with respect to longitudinal axis 351 of first melt channel 350.

Release melt channel 354 of nozzle tip 226 is used to transmit the molten material to first portion 356 of annular melt channel 352, which in this embodiment acts as a decompression chamber. A pressure of the molten material in decompression chamber 356 is reduced due to the material expansion allowed within the decompression chamber. From decompression chamber 356, the molten material flows into second portion 358 of annular melt channel 352, which in this embodiment acts as a compression chamber. Due to a restricted configuration of second portion 358, pressure of the molten material is increased as the molten material is forced through compression chamber 358 toward a mold gate 224 of mold cavity 222.

This arrangement of annular melt channel 352 balances the flow velocity and pressure of the melt exiting nozzle melt channel 214 resulting in an even/balanced flow out of annular melt channel 352 and into mold cavity 222.

In this embodiment, due to the "flushing" nature of the melt flow through the tip area of the nozzle there is not a conventional "bubble area" between retaining device 232, tip 226, and mold gate 224. For example, a "bubble area" can be seen as a stagnant area between retaining device 232, tip 226, and mold gate 224 that fills with material during a first shot. The material remains stagnant and typically does not flush out between shots. In one example, the stagnant material can be used to provide insulation between nozzle tip 226 and a mold. Respective pressure changes in the melt between second melt channel 354 and first and second portions 356 and 358 of annular melt channel 352 causes the molten material to flow between nozzle melt channel 214 and mold cavity 222 at a higher rate than in conventional nozzles, thereby mixing and maintaining melt in a molten condition to readily exit via mold gate 224.

In one example, this allows a better consistency of molten material due to mixing before mold cavity 222, thereby reducing or eliminating weld/flow lines within the molded product.

In another example, through use of this configuration, during color change, as discussed above, the previous color molten material is flushed out of nozzle 216 substantially within very few product cycles. This is substantially less than the 50-60 product cycles that customarily are required before a previous color is fully flushed out of a conventional nozzle arrangement.

FIG. 19 shows a cross-sectional view of a portion of a nozzle, according to one embodiment of the present invention. All elements shown in FIG. 19 are similar to those shown in FIG. 3 and described above, except in this embodiment seal 245 does not retain a nozzle tip 1926. Nozzle tip 1926 is retained in nozzle 216 through use of threading engagement between threads 1970 formed on nozzle tip 1926 and threads 1972 formed on nozzle 216. In other examples, instead of threads brazing or other coupling schemes could also be used.

Figure 4:
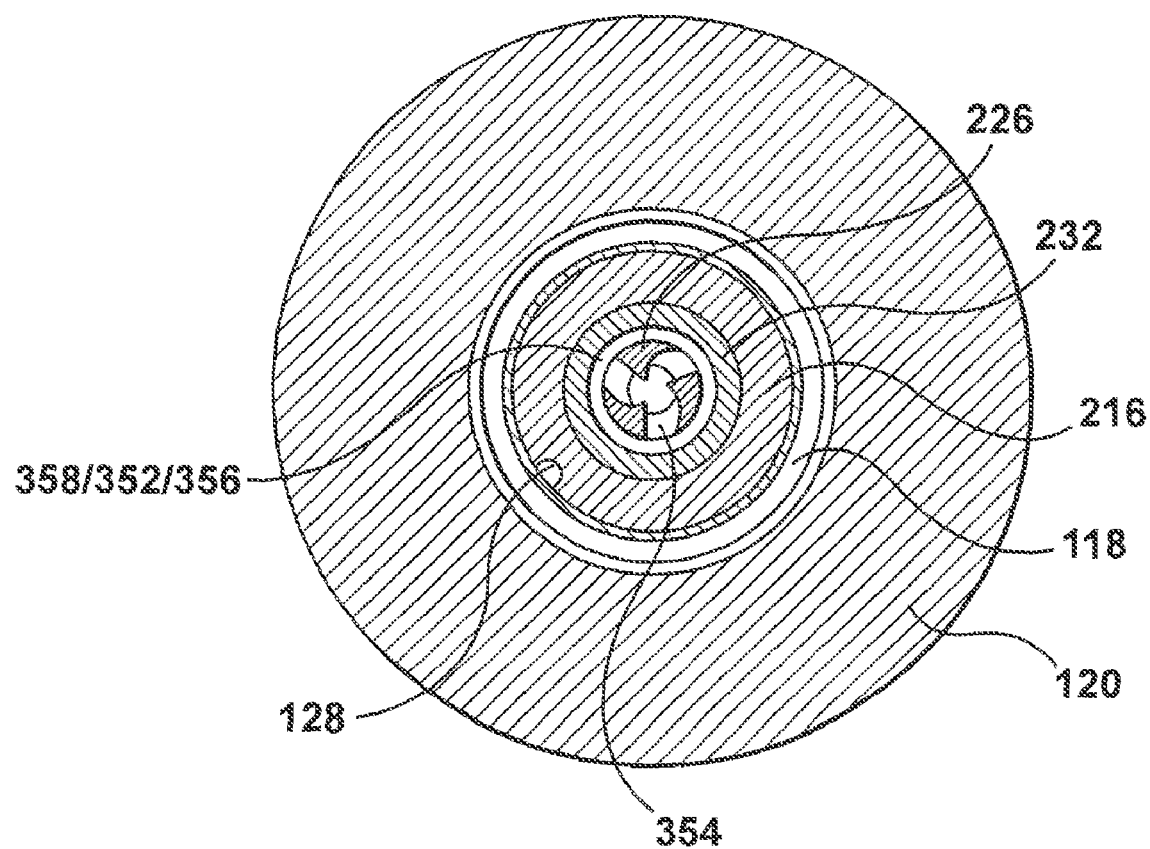
FIG. 4 shows a cross-sectional view of the nozzle of FIG. 2 taken along line A-A in FIG. 2, according to one embodiment of the present invention.

FIG. 4 is a cross-sectional view of nozzle 216 taken along line A-A in FIG. 2, according to one embodiment of the present invention. In this embodiment, three release melt channels 354 are used to carry melt from nozzle tip 226 to annular melt channel 352 (which may have decompression in portion 356). A specific number of release melt channels 354 is application specific, as are the parameters (sizes) of release melt channels 354, decompression chamber 356, and compression chamber 358.

FIGS. 5, 6, and 7 shows various configurations of nozzle tips 526, 626, and 726 according to various embodiments of the present invention, where common features are numbered in accordance with features previously described. A main difference between the nozzles shown in these figures is a number of release melt channels 354.

In other embodiments, first and second portion 356 and 358 of annular melt channel 352 do not include decompression and compression areas, respectively, and include other configurations.

FIGS. 17 and 18 show a side view and a cross-sectional view (taken along line F-F in FIG. 17), respectively, of a nozzle tip 1726, according to one embodiment of the present invention. Nozzle tip 1726 has a plurality of release melt channels 1754A on a first level and a second plurality of release melt channels 1754B on a second level. In one example, release melt channels 1754A are offset with respect to release melt channels 1754B. This can be done, for example, to provide an intercrossing melt flow. This allows for, for example, a substantial reduction weld/split lines as compared to only a single release melt channel or a single level release melt channel environment. In various examples, a number of release melt channels 1754A on the first level can be equal to or a different number that a number of release channels 1754B on the second level.

FIG. 18 includes all elements described above for FIGS. 2 and 3, with the alternative nozzle tip 1726, as described above for FIG. 17. In the example shown in FIG. 18, release melt channels 1754A and 1754B exit from first melt channel 350 into first portion 356 of annular melt channel 352.

FIGS. 8 and 9 are side sectional and cross-sectional views (looking into line B-B), respectively, of a nozzle for use in the machine of FIG. 1, according to one embodiment of the present invention. A nozzle 816 includes a nozzle melt channel 814 in a nozzle body 830. A nozzle tip 826 is positioned with respect to nozzle body 830 using a retaining device 832. An annular melt channel 852 is formed between nozzle tip 826 and retaining device 832. Nozzle tip 826 includes a first melt channel 850 having a central or longitudinal axis 851 and second, release melt channels 854, at least one of which has a central or longitudinal axis 853. In this embodiment, longitudinal axis 853 of second melt channel 854 is at an acute angle with respect to longitudinal axis 851 of first melt channel 850. Annular melt channel 852 includes a first portion 856 and a second portion 858. Additional features of FIGS. 8 and 9 are similar to similarly numbered features in the embodiments discussed above, unless otherwise noted. As best seen in FIG. 9, in this embodiment there are three release melt channels 854.

FIGS. 10 and 11 are side sectional and cross-sectional views (looking into line C-C), respectively, of a nozzle for use in the machine of FIG. 1, according to one embodiment of the present invention. A nozzle 1016 includes a nozzle melt channel 1014 in a nozzle body 1030. A nozzle tip 1026 is positioned with respect to nozzle body 1030 using a retaining device 1032. An annular melt channel 1052 is formed between nozzle tip 1026 and retaining device 1032. Nozzle tip 1026 includes a first melt channel 1050 and a second, release melt channel 1054. Annular melt channel 1052 includes a first portion 1056 and a second portion 1058. Most features of FIGS. 10 and 11 are similar to similarly numbered features the embodiments discussed above, unless otherwise noted. As best seen in FIG. 11, a main difference in this embodiment is the number of release melt channels 1054, which in this example is six.

FIGS. 12 and 13 are side sectional and cross-sectional views (looking into line D-D), respectively, of a nozzle for use in the machine of FIG. 1, according to one embodiment of the present invention. A nozzle 1216 includes a nozzle melt channel 1214 in a nozzle body 1230. A nozzle tip 1226 is positioned with respect to nozzle body 1230 using a retaining device 1232. An annular melt channel 1252 is formed between nozzle tip 1226 and retaining device 1232. Nozzle tip 1226 includes a first melt channel 1250 and second, release melt channels 1254. In this embodiment, release melt channels 1254 have outlets proximate a downstream end of retaining device 1232 that feed a melt stream to annular melt channel 1252, which includes a first portion 1256 and a second portion 1258. Additional features of FIGS. 12 and 13 are similar to similarly numbered features in the embodiments discussed above, unless otherwise noted. With reference to FIG. 13, this embodiment includes three release melt channels 1254, which exit further downstream of the second or release melt channels disclosed in the previous embodiments, where retaining device 1232 touches mold plate 1220, resulting in a shorter annular melt channel 1252.

FIGS. 14 and 15 are side sectional and cross-sectional views (looking into line E-E), respectively, of a nozzle for use in the machine of FIG. 1, according to one embodiment of the present invention. A nozzle 1416 includes a nozzle melt channel 1414 in a nozzle body 1430. A nozzle tip 1426 is positioned with respect to nozzle body 1430 using a retaining device 1432. An annular melt channel 1452 is formed between nozzle tip 1426 and retaining device 1432. Nozzle tip 1426 includes a first melt channel 1450 and second, release melt channels 1454. In this embodiment, release melt channels 1454 have outlets proximate a downstream end of nozzle body 1430 that feed a melt stream to annular melt channel 1452, which includes a first portion 1456 and a second portion 1458. Additional features of FIGS. 14 and 15 are similar to similarly numbered features in the embodiments discussed above, unless otherwise noted. With reference to FIG. 15, this embodiment includes three release melt channels 1454 the outlets of which are proximate a polygonal-like protrusion on retaining device 1432 that sits within insulative air space 1419 of nozzle bore 1418.

Exemplary Annular Melt Channel Dimensions

FIG. 16 is a side sectional view of a portion of a nozzle tip and a retaining device for use in the machine of FIG. 1, according to one embodiment of the present invention. In this embodiment, an annular melt channel 1652 is defined between a nozzle tip 1626, having a first melt channel 1650 and at least two second melt channels 1654, and a retaining device 1632. Second melt channels 1654 of nozzle tip 1626 are for directing a melt stream into annular melt channel 1652, which includes a first inner diameter D1 in a first portion 1656 of annular melt channel 1652 and a second inner diameter D2 in a second portion 1658 of annular melt channel 1656. In this example, D1 is smaller than D2. This figure also shows an outer diameter D3 of annular melt channel 1652 is constant for the length of annular melt channel 1652 such that an annular area within first portion 1656 of annular melt channel 1652 is larger than an annular area within second portion 1658 of annular channel 1652.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A nozzle for an injection molding apparatus, comprising:

a nozzle body having a nozzle melt channel with a longitudinal axis;

a nozzle tip, including, a first melt channel in fluid communication with the nozzle melt channel, the first melt channel having a first melt channel longitudinal axis, and a second melt channel in fluid communication with the first melt channel and having a second melt channel longitudinal axis that is substantially normal with respect to the first melt channel longitudinal axis;

a retaining device that positions the nozzle tip with respect to the nozzle body; and an annular melt channel formed between the nozzle tip and the retaining device, wherein a first portion of the annular melt channel comprises a decompression chamber and a second portion of the annular melt channel comprises a compression chamber downstream of the decompression chamber and wherein an outlet of the nozzle tip second melt channel is in direct fluid communication with the decompression chamber of the annular channel.

2. The nozzle of claim 1, wherein there are between three and six of the nozzle tip second melt channels.

3. The nozzle of claim 1, wherein the second melt channel comprises one of a bore and a hole.

4. The nozzle of claim 1, wherein an area between the nozzle tip and a mold gate is devoid of a bubble area.

5. The nozzle of claim 1, wherein the nozzle tip is made from a thermally conductive material.

6. The nozzle of claim 1, wherein the nozzle tip comprises a first section made from a thermally conductive material and a second section made from a thermally insulative material.

7. The nozzle of claim 6, wherein the thermally conductive material comprises one of a copper-based material and a steel-based material.

8. The nozzle of claim 6, wherein the thermally insulative material comprises a titanium-based material.

9. The nozzle of claim 1, wherein the retaining device comprises:
  a retaining portion that positions the tip with respect to the nozzle body; and
  a sealing portion that insulates the tip from a mold plate.

10. The nozzle of claim 9, wherein the sealing portion touches the mold plate.

11. The nozzle of claim 1, wherein the retaining device is made from at least one of steel, titanium, and ceramic.

12. The nozzle of claim 1, wherein the annular melt channel includes:
  the decompression chamber having a first inner diameter, and
  the compression chamber having a second inner diameter, wherein the second inner diameter is larger than the first inner diameter for at least a portion of the compression chamber.

13. The nozzle of claim 1, wherein the nozzle tip comprises a first section made from a thermally conductive material and a second section made from a wear resistant material.

14. An injection molding apparatus, comprising:
  a manifold having at least one manifold melt channel therethrough;
  at least one nozzle having a nozzle body including a nozzle melt channel with a longitudinal axis;
  a nozzle tip, including,
    a first melt channel in fluid communication with the nozzle melt channel, the first melt channel having a first melt channel longitudinal axis, and
    a plurality of second melt channels in fluid communication with the first melt channel wherein each second melt channel has a second melt channel longitudinal axis that is substantially normal with respect to the first melt channel longitudinal axis;
  a retaining device that positions the nozzle tip with respect to the nozzle body; and
  an annular melt channel formed between the nozzle tip and the retaining device, wherein the annular melt channel includes a decompression chamber in fluid communication with the outlets of the plurality of second melt channels and a compression chamber downstream of and in fluid communication with the decompression chamber.

15. The injection molding apparatus of claim 14, wherein there are between three and six of the nozzle tip second melt channels.

16. The injection molding apparatus of claim 14, wherein the second melt channel comprise one of a bore and a hole.

17. The injection molding apparatus of claim 14, wherein an area between the nozzle tip and a mold cavity is devoid of a bubble area.

18. The injection molding apparatus of claim 14, wherein the nozzle tip is made from a thermally conductive material.

19. The injection molding apparatus of claim 14, wherein the nozzle tip comprises a first portion made from a thermally conductive material and a second portion made from a thermally insulative material.

20. The injection molding apparatus of claim 19, wherein the thermally conductive material comprises one of a copper-based material and a steel-based material.

21. The injection molding apparatus of claim 19, wherein the thermally insulative material comprises a titanium-based material.

22. The injection molding apparatus of claim 14, wherein the retaining device comprises:
  a retaining portion that retains the nozzle tip with respect to the nozzle body; and
  a sealing portion that insulates the nozzle tip from a mold plate.

23. The injection molding apparatus of claim 22, wherein the sealing portion touches the mold plate.

24. The injection molding apparatus of claim 14, wherein the retaining device comprises one of steel, titanium, and ceramic.

25. The nozzle of claim 14, wherein the annular melt channel includes:
  the decompression chamber having a first inner diameter, and
  the compression chamber having a second inner diameter, wherein the second inner diameter is larger than the first inner diameter for at least a portion of the compression chamber.

26. The nozzle of claim 14, wherein the nozzle tip comprises a first section made from a thermally conductive material and a second section made from a wear resistant material.

27. A nozzle for an injection molding apparatus, comprising:
  a nozzle body having a nozzle melt channel;
  a nozzle tip, including
    a first melt channel partially in fluid communication with the nozzle melt channel, the first melt channel having a first melt channel central axis,
    a release melt channel in fluid communication with the first melt channel, the release melt channel having a release melt channel central axis, wherein the release melt channel central axis is substantially normal with respect to the first melt channel central axis, and
    a downstream portion having an outer surface area extending proximate to and below an outlet of the release melt channel;
  a retaining device that retains the nozzle tip to the nozzle body and contacts a mold plate to provide a seal between the nozzle and the mold plate, the retaining device having a downstream portion having an inner surface area proximate to and below the outlet of the release melt channel; and an annular melt channel formed between the outer surface of the downstream portion of the nozzle tip and the inner surface of the downstream portion of the retaining device, wherein the annular melt channel includes a decompression chamber in fluid communication with an outlet of the release melt channel and a compression chamber in fluid communication with the decompression chamber.

28. The nozzle of claim 27, wherein an outer wall of the retaining device includes threads for engaging complementary threads on an inner wall of the nozzle body.

29. The nozzle of claim 27, wherein there are between three and six of the nozzle tip release channels.

30. A nozzle for an injection molding apparatus, comprising:
   a nozzle body having a nozzle melt channel with a longitudinal axis;
   a nozzle tip, including,
      a first melt channel fluid communication with the nozzle melt channel, the first melt channel having a first melt channel longitudinal axis, and
      a plurality of second melt channels in fluid communication with the first melt channel and each having a second melt channel longitudinal axis that is substantially normal with respect to the first melt channel longitudinal axis, wherein at least one of the outlets of the second melt channels is upstream of at least one other of the outlets of the second melt channels;
   a retaining device that positions the nozzle tip with respect to the nozzle body; and
   an annular melt channel formed between the nozzle tip and the retaining device, wherein the annular melt channel includes a decompression chamber in fluid communication with each of the outlets of the second melt channels and a compression chamber in fluid communication with the decompression chamber.

31. The nozzle of claim 30, wherein the retaining device is a nozzle tip retainer having a retaining portion that retains the nozzle tip with respect to the nozzle body and a sealing portion that insulates the nozzle tip from a mold cavity plate.

32. A nozzle for an injection molding apparatus, comprising:
   a nozzle body having a nozzle melt channel with a longitudinal axis;
   a nozzle tip, including,
      a first melt channel in fluid communication with the nozzle melt channel, the first melt channel having a first melt having a first melt channel longitudinal axis, and
      a plurality of second melt channels in fluid communication with the first melt channel and each having a second melt channel longitudinal axis that is at an angle with respect to the first melt channel longitudinal axis;
   a retaining device that positions the nozzle tip with respect to the nozzle body; and
   an annular melt channel formed between the nozzle tip and the retaining device, wherein the annular melt channel includes a decompression chamber in fluid communication with each of the outlets of the second melt channels and a compression chamber in downstream fluid communication with the decompression chamber and wherein the decompression chamber has a first inner diameter and the compression chamber has a second inner diameter that is larger than the first inner diameter of the decompression chamber for at least a portion of the compression chamber.

33. The nozzle of claim 32, wherein the retaining device is a nozzle tip retainer having a retaining portion that retains the nozzle tip with respect to the nozzle body and a sealing portion that insulates the nozzle tip from a mold cavity plate.

34. The nozzle of claim 32, wherein an outer diameter of the annular channel is constant within the decompression chamber and for at least the portion of the compression chamber.

35. The nozzle of claim 32, wherein each of the second melt channel longitudinal axis is substantially normal with respect to the first melt channel longitudinal axis.

36. A nozzle for an injection molding apparatus, comprising:
   a nozzle body having a nozzle melt channel with a longitudinal axis;
   a nozzle tip, including,
      a first melt channel in fluid communication with the nozzle melt channel, the first melt channel having a first melt channel longitudinal axis,
      a plurality of second melt channels in fluid communication with the first melt channel and each having a second melt channel longitudinal axis that is at an angle with respect to the first melt channel longitudinal axis, and
      a downstream portion including a first length with a first outer diameter and a second length having a second outer diameter, wherein the second outer diameter is larger than the first outer diameter;
   a retaining device that positions the nozzle tip with respect to the nozzle body, the retaining device having a downstream portion in opposition with the downstream portion of the nozzle tip, wherein the downstream portion of the retaining device includes an inner diameter that is constant for at least a length that corresponds to the first and second lengths of the downstream portion of the nozzle tip; and
   an annular melt channel formed between the downstream portion of the nozzle tip and the downstream portion of the retaining device, wherein the first length of the downstream portion of the nozzle tip is within a decompression chamber of the annular melt channel and the second length of the downstream portion of the nozzle tip is within a compression chamber of the annular melt channel that is in downstream fluid communication with the decompression chamber.

37. The nozzle of claim 36, wherein the retaining device is a nozzle tip retainer having a retaining portion that remains the nozzle tip with respect to the nozzle body and a sealing portion that insulates the nozzle tip from a mold cavity plate.

38. The nozzle of claim 36, wherein each of the second melt channel longitudinal axis is substantially normal with respect to the first melt channel longitudinal axis.

* * * * *

UNITED STATES PATENT AND TRADEMARK OFFICE
CERTIFICATE OF CORRECTION

PATENT NO.       : 7,344,372 B2                                                Page 1 of 1
APPLICATION NO.  : 11/065167
DATED            : March 18, 2008
INVENTOR(S)      : Fabrice Fairy It is certified that error appears in the above-identified patent and that said Letters Patent is hereby corrected as shown below:

In column 9, claim 9, line 29, replace "positions" with -- retains --.

In column 11, claim 32, line 49, delete "having a first melt" before "channel".

Signed and Sealed this

Eighth Day of July, 2008

JON W. DUDAS
*Director of the United States Patent and Trademark Office*